United States Patent
Tatsuzue

(10) Patent No.: US 9,423,758 B2
(45) Date of Patent: Aug. 23, 2016

(54) POWER SUPPLY APPARATUS AND IMAGE FORMING APPARATUS

(71) Applicant: CANON KABUSHIKI KAISHA, Tokyo (JP)

(72) Inventor: Akira Tatsuzue, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/635,881

(22) Filed: Mar. 2, 2015

(65) Prior Publication Data
US 2015/0268615 A1 Sep. 24, 2015

(30) Foreign Application Priority Data
Mar. 20, 2014 (JP) ................. 2014-058499

(51) Int. Cl.
*G03G 15/00* (2006.01)
*H02M 3/28* (2006.01)

(52) U.S. Cl.
CPC *G03G 15/80* (2013.01); *H02M 3/28* (2013.01)

(58) Field of Classification Search
CPC .............................. G03G 15/80; H02M 7/217
USPC ......................................... 399/88, 37; 363/89
See application file for complete search history.

(56) References Cited

U.S. PATENT DOCUMENTS

| 7,483,644 B2 * | 1/2009 | Uchiyama et al. ........ H02J 3/02 399/37 |
| 2013/0016989 A1 * | 1/2013 | Fujita ..................... G03G 15/00 399/88 |

FOREIGN PATENT DOCUMENTS

JP 2009-133997 A 6/2009

* cited by examiner

*Primary Examiner* — Sophia S Chen
(74) *Attorney, Agent, or Firm* — Fitzpatrick, Cella, Harper & Scinto

(57) ABSTRACT

The power supply apparatus includes a transformer that generates an AC voltage; a driving unit that drives a primary side of the transformer to set an output on a secondary side of the transformer to a predetermined value; a rectifying and smoothing unit connected to one end on the secondary side and adapted to rectify and smooth the AC voltage and output a DC voltage of a positive potential; a voltage generation unit connected to another end on the secondary side and adapted to generate a DC voltage to be superposed with the AC voltage; a control unit connected to the rectifying and smoothing unit and the voltage generation unit and adapted to control a current value according to the DC voltage output by the rectifying and smoothing unit and control the DC voltage generated by the voltage generation unit.

10 Claims, 5 Drawing Sheets

POWER SUPPLY APPARATUS AND IMAGE FORMING APPARATUS

BACKGROUND OF THE INVENTION

1. Field of the Invention

The present invention relates to a power supply apparatus and an image forming apparatus equipped with the same.

2. Description of the Related Art

An image forming apparatus which adopts an electrophotographic method is equipped with a high voltage power supply apparatus (hereinafter also referred to as a high voltage power supply) adapted to generate a high voltage, and the high voltage power supply is indispensable for an image forming process with respect to recording material. The high voltage power supply apparatus can be any of various modularized power supplies depending on application, including, for example, a power supply for charging, power supply for developing, power supply for transferring, and power supply for fixing. The modularized high voltage power supplies have different specifications according to the configuration of the image forming apparatus. For example, a superposed AC-DC high voltage power supply configured to superpose an alternate current voltage with a direct current voltage is used as a power supply for charging. The superposed AC-DC high voltage power supply controls an alternate current voltage value and direct current voltage value according to load conditions (e.g., load capacity of a charge roller) in order to form images properly in an image forming possess.

In a typical configuration, the superposed AC-DC high voltage power supply is equipped with an alternate current voltage generating transformer and direct current voltage generating transformer and adapted to generate an alternate current voltage superposed with a direct current voltage, using the two transformers. Inexpensive space-saving configurations of high voltage power supplies include a configuration which is set up by reducing the number of transformers in the above-described configuration and in which a high voltage power supply is made up of one transformer and a transistor (see Japanese Patent Application Laid-Open No. 2009-133997). FIG. 6A is a circuit diagram of a high voltage power supply adapted to output a sine-wave alternate current voltage superposed with a direct current voltage of a negative potential. The high voltage power supply in FIG. 6A includes a transformer 103, driving circuits 104 and 106, an AC current detection circuit 105, a direct current voltage detection circuit 107, a half-wave rectification circuit 150, and a transistor 162. The driving circuit 106, which is a circuit adapted to control driving of the transistor 162, compares detection results produced by the direct current voltage detection circuit 107 with a direct current voltage control signal 102 which indicates a target direct current voltage value and thereby performs control so as to maintain a direct current voltage value generated at an output end 108 at a predetermined voltage value. A current flows through the transistor 162 when a voltage on a high voltage side of a smoothing capacitor 142, i.e., an output voltage of the half-wave rectification circuit 150, is higher than a ground potential (hereinafter referred to as a GND potential). That is, a current flows through the transistor 162 when a peak voltage of an output voltage Vout171 is higher than the GND potential. When the peak voltage of the output voltage Vout171 is higher than the GND potential, since a current flows through the transistor 162, the driving circuit 106 can control the direct current voltage by driving the transistor 162. Note that configuration and operation of the circuitry in FIG. 6A will be described later.

For example, along with downsizing and material changes of a charge roller and the like which act as loads on the high voltage power supply, an amplitude range of the alternate current voltage of the power supply for charging is decreasing. With the conventional superposed AC-DC high voltage power supply shown in FIG. 6A, when the amplitude of the alternate current voltage falls below the absolute value of the direct current voltage, the peak voltage of the output voltage Vout171 becomes lower than the GND potential, and consequently a voltage of a positive potential cannot be produced in the smoothing capacitor 142. As a result, since no current flows through the transistor 162, the driving circuit 106 can no longer control the direct current voltage by driving the transistor 162. This disables the use of the above-described configuration which uses one transformer and a transistor. On the other hand, when a configuration with two transformers is used, the increased number of transformers causes a cost increase as well as an increase in transformer installation space.

SUMMARY OF THE INVENTION

The present invention has been made in view of the above circumstances and allows a direct current voltage to be output even in case of a reduction in the amplitude of an alternate current voltage and enables equipment downsizing and cost reduction.

To solve the above problem, the present invention provides a power supply apparatus adapted to output a voltage obtained by superposing an alternate current voltage with a direct current voltage, including a transformer adapted to generate the alternate current voltage, a driving unit connected to a primary side of the transformer and adapted to drive the primary side of the transformer so as to output the alternate current voltage from a secondary side of the transformer, a rectifying and smoothing unit connected to one end on the secondary side of the transformer and adapted to rectify and smooth the alternate current voltage and thereby output a direct current voltage of a positive potential, a voltage generation unit connected to another end on the secondary side of the transformer and adapted to generate the direct current voltage, and a control unit connected to the rectifying and smoothing unit and the voltage generation unit and adapted to control a current value according to the direct current voltage which is output by the rectifying and smoothing unit and thereby control the direct current voltage generated by the voltage generation unit.

The present invention provides an image forming apparatus including an image forming unit adapted to form an image, and a power supply adapted to supply a voltage obtained by superposing an alternate current voltage with a direct current voltage to the image forming unit, wherein the power supply includes a transformer adapted to generate the alternate current voltage, a driving unit connected to a primary side of the transformer and adapted to drive the primary side of the transformer so as to output the alternate current voltage form a secondary side of the transformer, a rectifying and smoothing unit connected to one end on the secondary side of the transformer and adapted to rectify and smooth the alternate current voltage and thereby output a direct current voltage of a positive potential, a voltage generation unit connected to another end on the secondary side of the transformer and adapted to generate the direct current voltage, and a control unit connected to the rectifying and smoothing unit and the voltage generation unit and adapted to control a current value according to the direct current voltage which is output by the rectifying and smoothing unit and thereby control the direct current voltage generated by the voltage generation unit. Further objects of the present invention will become apparent by referring to detailed description of the invention in conjunction with the accompanying drawings.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[Circuit Configuration of Conventional High Voltage Power Supply Apparatus]

Figure 6A:
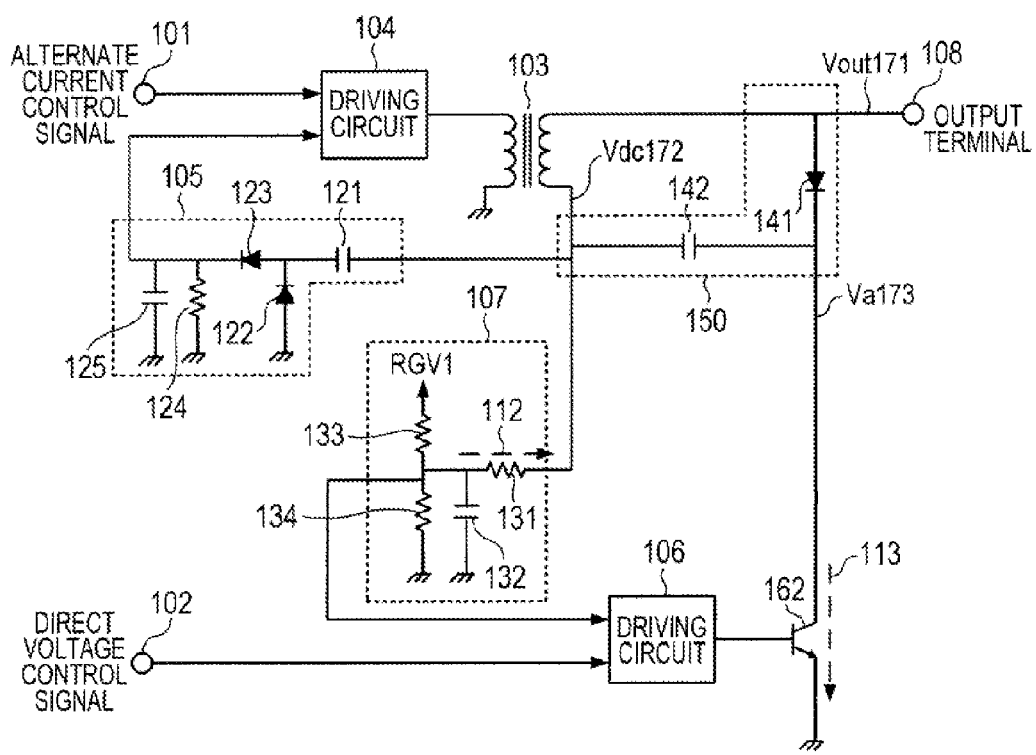
FIG. 6A is a circuit diagram of a high voltage power supply apparatus according to a conventional example.
Figure 6B:
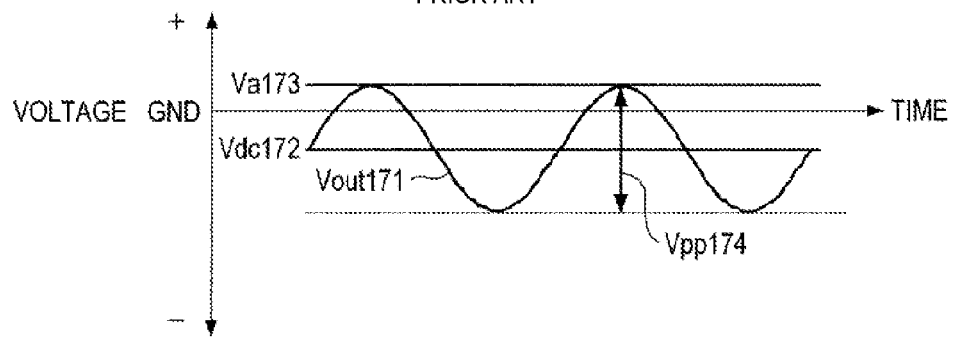
FIG. 6B is a diagram showing a voltage waveform in the circuit diagram of the high voltage power supply apparatus according to the conventional example.

First, for comparison with embodiments described later, a typical conventional high voltage power supply apparatus will be described using FIGS. 6A and 6B. FIG. 6A is a circuit diagram of a high voltage power supply apparatus adapted to output a sine-wave alternate current voltage superposed with a direct current voltage of a negative potential. The high voltage power supply apparatus in FIG. 6A includes a transformer 103, driving circuits 104 and 106, an AC current detection circuit 105, a direct current voltage detection circuit 107, a half-wave rectification circuit 150 and a transistor 162. The transformer 103 is driven by a driving circuit 104 connected to a primary winding on a primary side of the transformer 103. An output voltage Vout171 generated on a secondary side of the transformer 103 is output from the output end 108 and supplied to a load. An alternating current (load current) flowing through the load is detected by the AC current detection circuit 105 and a detection result is fed back to the driving circuit 104, where the AC current detection circuit 105 is made up of a coupling capacitor 121, rectifier diodes 122 and 123, a current detection resistor 124 and a capacitor 125. The driving circuit 104 compares an AC current control signal 101 which represents a target current value of the load current with the detection result produced by the AC current detection circuit 105 and controls driving of the transformer 103 such that the alternating current flowing through the load will match a predetermined value indicated by the AC current control signal 101.

The direct current voltage detection circuit 107 includes a sensing resistor 131, a capacitor 132, voltage dividing resistors 133 and 134 and a constant voltage source RGV1, and detects a voltage developed across the sensing resistor 131. The driving circuit 106 is connected to a base terminal of the transistor 162 and adapted to drive the transistor 162. The driving circuit 106 compares detection results produced by the direct current voltage detection circuit 107 with the direct current voltage control signal 102 which indicates a targeted direct current voltage value and thereby performs control such that the direct current voltage value generated at the output end 108 will match a predetermined voltage value indicated by the direct current voltage control signal 102. An output voltage of the transformer 103 is converted into a direct current voltage by the half-wave rectification circuit 150 made up of a diode 141 and a smoothing capacitor 142, and the direct current voltage is input to a collector terminal of the transistor 162. In FIG. 6A, dash-lined arrows 112 and 113 indicate paths (directions) along which DC currents flow, respectively. When the value of a current flowing through the transistor 162 is changed, the value of a current flowing through the sensing resistor 131 of the direct current voltage detection circuit 107 changes as well, causing a voltage drop amount developed across the sensing resistor 131 to change as well. The voltage drop amount across the sensing resistor 131 appears as an output direct current voltage and is superposed with an alternate current voltage generated on a secondary side of the transformer 103. In order for a current to flow through the transistor 162, it is necessary that a voltage on a high voltage side of the smoothing capacitor 142, i.e., an output voltage in a later stage of the half-wave rectification circuit 150, is higher than a GND potential. In order for the smoothing capacitor 142 to be charged it is necessary that the diode 141 is in a conducting state and that a peak voltage of the output voltage Vout171 output from the output end 108 has to be higher than the GND potential. That is, in order for a current to flow through the transistor 162, the peak voltage of the output voltage Vout171 has to be higher than the GND potential. When the peak voltage of the output voltage Vout171 is lower than the GND potential, no current flows through the transistor 162, and consequently, the driving circuit 106 cannot control the direct current voltage by driving the transistor 162. There are limits to ranges of alternate current voltage and direct current voltage which can be output, and specifically, an amplitude of the alternate current voltage generated on the secondary side of the transformer 103 has to be larger than the absolute value of the direct current voltage produced by the voltage drop across the sensing resistor 131.

First Embodiment

Next, a superposed AC-DC high voltage power supply apparatus according to a first embodiment will be described with reference to FIGS. 1 and 2. The present embodiment differs from the conventional high voltage power supply apparatus described above in that the half-wave rectification circuit is replaced with a half-wave voltage doubler rectifier circuit.

[Circuit Configuration of High Voltage Power Supply Apparatus]

Figure 1:
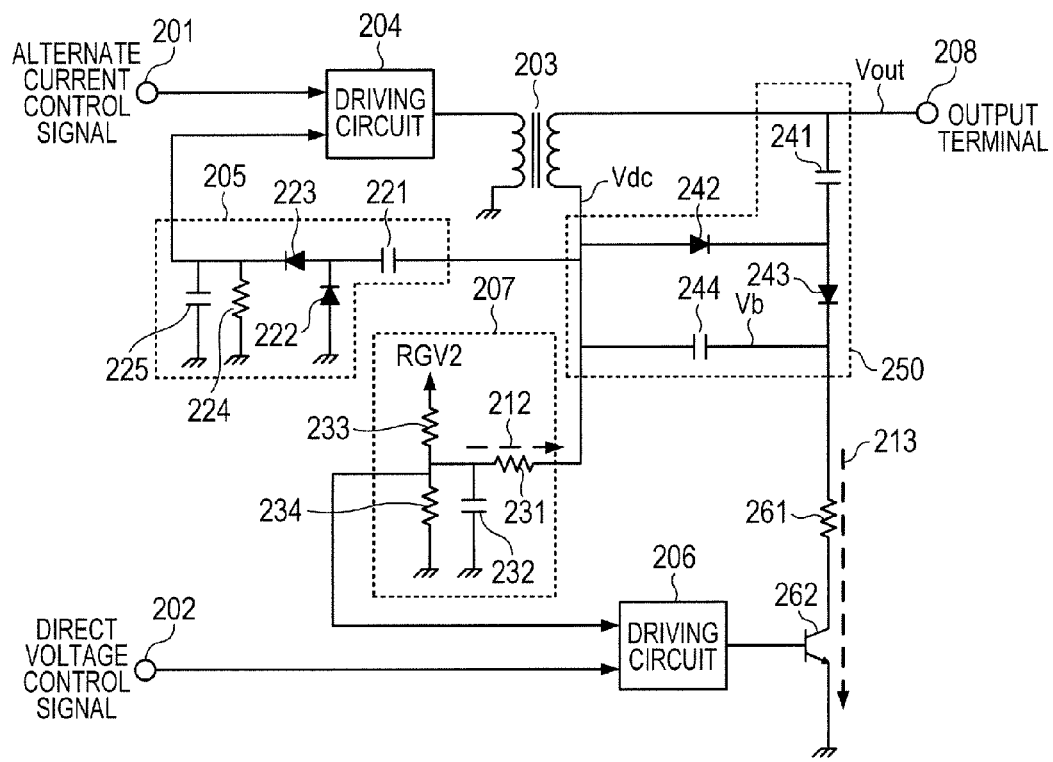
FIG. 1 is a circuit diagram of a high voltage power supply apparatus according to a first embodiment.

FIG. 1 is a circuit diagram of a high voltage power supply apparatus according to the present embodiment, the high voltage power supply apparatus being adapted to output a sine-wave alternate current voltage superposed with a direct current voltage of a negative potential. The high voltage power supply apparatus in FIG. 1 includes a transformer 203, driving circuits 204 and 206, an AC current detection circuit 205, a direct current voltage detection circuit 207, a half-wave voltage doubler rectifier circuit 250 and a transistor 262. The AC current detection circuit 205, which is a first detection section, has a configuration similar to the conventional AC current detection circuit 105 described above and includes a coupling capacitor 221, rectifier diodes 222 and 223, a current detection resistor 224 and a capacitor 225. Also, the driving circuit 204, which is a driving section, is similar in configuration to the conventional driving circuit 104 described above and is adapted to accept as input an AC current control signal 201 which is a first control signal as well as detection results from the AC current detection circuit 205 and drive a primary side of the transformer 203. The direct current voltage detection circuit 207, which is a second detection section, has a configuration similar to the conventional direct current voltage detection circuit 107 described above and includes a sensing resistor 231, a capacitor 232, voltage dividing resistors 233 and 234 and a constant voltage source RGV2, which make up a generating section. Also, the driving circuit 206, which is a control section, is similar in configuration to the conventional driving circuit 106 described above and is adapted to accept as input a direct current voltage control signal 202 which is a second control signal as well as detection results from the direct current voltage detection circuit 207 and control driving of the transistor 262. Furthermore, the transformer 203 and transistor 262 are similar to the conventional transformer 103 and transistor 162. Dash-lined arrows 212 and 213 indicate paths of DC currents flowing in the direct current voltage detection circuit 207 and transistor 262, respectively, as is conventionally the case.

In the present embodiment, an output from the transformer 203 is converted into a direct current voltage of a positive potential by the half-wave voltage doubler rectifier circuit 250, which is a rectifying and smoothing section, made up of a capacitor 241, rectifier diodes 242 and 243 and a smoothing capacitor 244 unlike the conventional half-wave rectification circuit 150. Then, the direct current voltage generated by the half-wave voltage doubler rectifier circuit 250 is input to a collector terminal of the transistor 262 through a current limiting resistor 261. The driving circuit 206 changes a current value of the DC current 213 flowing through the transistor 262 and thereby changes a current value of the DC current 212 flowing through the sensing resistor 231 of the direct current voltage detection circuit 207. Then, as the current value of the DC current 212 changes, a voltage drop amount across the sensing resistor 231 changes, thereby controlling the direct current voltage to be superposed with the alternate current voltage.

[Power Supply Waveform of High Voltage Power Supply Apparatus]

Figure 2:
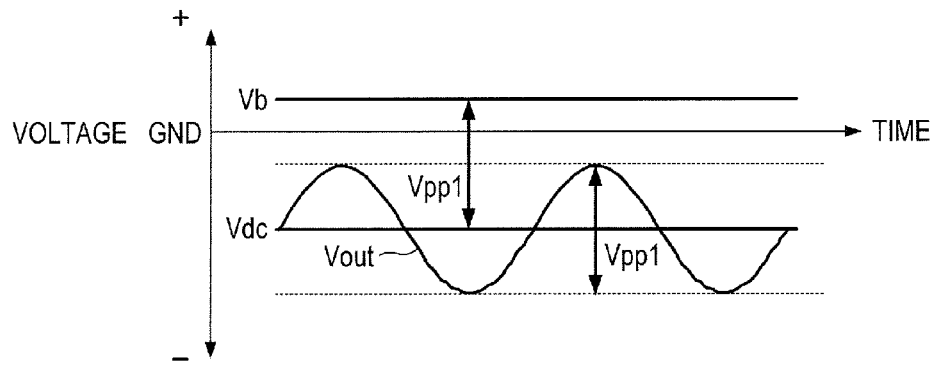
FIG. 2 is a diagram showing a voltage waveform of the high voltage power supply apparatus according to the first embodiment.

FIG. 2 is a diagram showing a voltage waveform of the high voltage power supply apparatus according to the present embodiment. In FIG. 2, the abscissa represents time while the ordinate represents voltage, "+" indicates positive (plus) potential, "−" indicates negative (minus) potential, and GND indicates the ground potential (0 volts). Voltage waveforms Vout, Vdc and Vb shown in FIG. 2 are voltage waveforms at locations Vout, Vdc and Vb in the circuit shown in FIG. 1, respectively. That is, the voltage waveform Vout shows a voltage waveform of the output voltage Vout at an output end 208 while the voltage waveform Vdc shows a voltage waveform of a direct current voltage Vdc to be superposed with an alternate current voltage generated on a secondary side of the transformer 203. Also, the voltage waveform Vb shows a voltage waveform of an output voltage of the half-wave voltage doubler rectifier circuit 250 which is on a high-potential side of the smoothing capacitor 244. The voltage waveform Vout of the output end 208 is a sine wave whose center voltage is the direct current voltage Vdc and Vpp1 in FIG. 2 is a peak-to-peak voltage of the alternate current voltage generated on the secondary side of the transformer 203. The half-wave voltage doubler rectifier circuit 250 accepts input of the alternate current voltage generated on the secondary side of the transformer 203 and generates a direct current voltage current voltage of a voltage amplitude twice as large as the input alternating current, i.e., a direct current voltage (Vpp1/2)×2 times larger. Thus, as shown in FIG. 2, the voltage Vb is at a level increased by the voltage Vpp1 (=(Vpp1/2)×2) from the voltage Vdc.

Here, in order for a current to flow through the transistor 262, the voltage Vb has to be higher than the GND potential. That is, if Eq. (1) shown below holds, current can be passed through the transistor 262 and the driving circuit 206 can control the direct current voltage.

$$Vb = Vdc + Vpp1 > 0 \tag{1}$$

Voltage waveforms in the conventional high voltage power supply apparatus shown in FIG. 6A described above are shown in FIG. 6B. In FIG. 6B, the abscissa represents time while the ordinate represents voltage, "+" indicates positive (plus) potential, "−" indicates negative (minus) potential, and GND indicates the ground potential (0 volts). Voltage waveforms Vout171, Vdc172 and Va173 shown in FIG. 6B are voltage waveforms at locations Vout171, Vdc172 and Va173 in the circuit shown in FIG. 6A, respectively. That is, the voltage waveform Vout171 shows a voltage waveform of the output voltage Vout171 at an output end 108 while the voltage waveform Vdc172 shows a voltage waveform of a direct current voltage Vdc172 to be superposed with an alternate current voltage generated on the secondary side of the transformer 103. Also, the voltage waveform Va173 shows a voltage waveform of an output voltage of the half-wave rectification circuit 150, i.e., the voltage on the high-potential side of the smoothing capacitor 142. Also, Vpp174 in FIG. 6B is a peak-to-peak voltage of the alternate current voltage generated on the secondary side of the transformer 103.

Here, in order for a current to flow through the transistor 162, the voltage Va173 has to be higher than the GND potential. That is, if Eq. (2) shown below holds, current can be passed through the transistor 162 and the driving circuit 106 can control the direct current voltage.

$$Va173 = Vdc172 + (Vpp174/2) > 0 \tag{2}$$

As can be seen from Eqs. (1) and (2), when the peak-to-peak voltages are identical, the high voltage power supply apparatus according to the present embodiment represented by Eq. (1) can output direct current voltage in a wider voltage range than can the conventional high voltage power supply apparatus represented by Eq. (2). From Eq. (1), a voltage difference between the direct current voltage Vb and direct current voltage Vdc on the high voltage power supply apparatus according to the present embodiment is Vpp1. On the other hand, from Eq. (2), a voltage difference between the direct current voltage Va173 and direct current voltage Vdc172 on the conventional high voltage power supply apparatus is Vpp174/2. Since the peak-to-peak voltages Vpp1 and Vpp174 in Eqs. (1) and (2) are identical in voltage value, it can be seen that the high voltage power supply apparatus according to the present embodiment has an output range of direct current voltage twice as wide as the conventional high voltage power supply apparatus.

The above configuration allows the range of the output direct current voltage to be increased without depending on an amplitude voltage of the alternate current voltage generated on the secondary side of the transformer 203. Furthermore, reducing the required number of transformers to one allows installation space to be reduced, enabling equipment downsizing and cost reduction. Thus, as described so far, the present embodiment allows a direct current voltage to be output even in case of a reduction in the amplitude of an alternate current voltage and enables equipment downsizing and cost reduction.

Second Embodiment

A superposed AC-DC high voltage power supply apparatus according to a second embodiment will be described with reference to FIGS. 3A and 3B. Whereas a high voltage power supply apparatus using a half-wave voltage doubler rectifier circuit has been described in the first embodiment, the present embodiment differs in that a half-wave voltage quadrupler rectifier circuit is used instead of a half-wave voltage doubler rectifier circuit.

[Circuit Configuration of High Voltage Power Supply Apparatus]

Figure 3A:
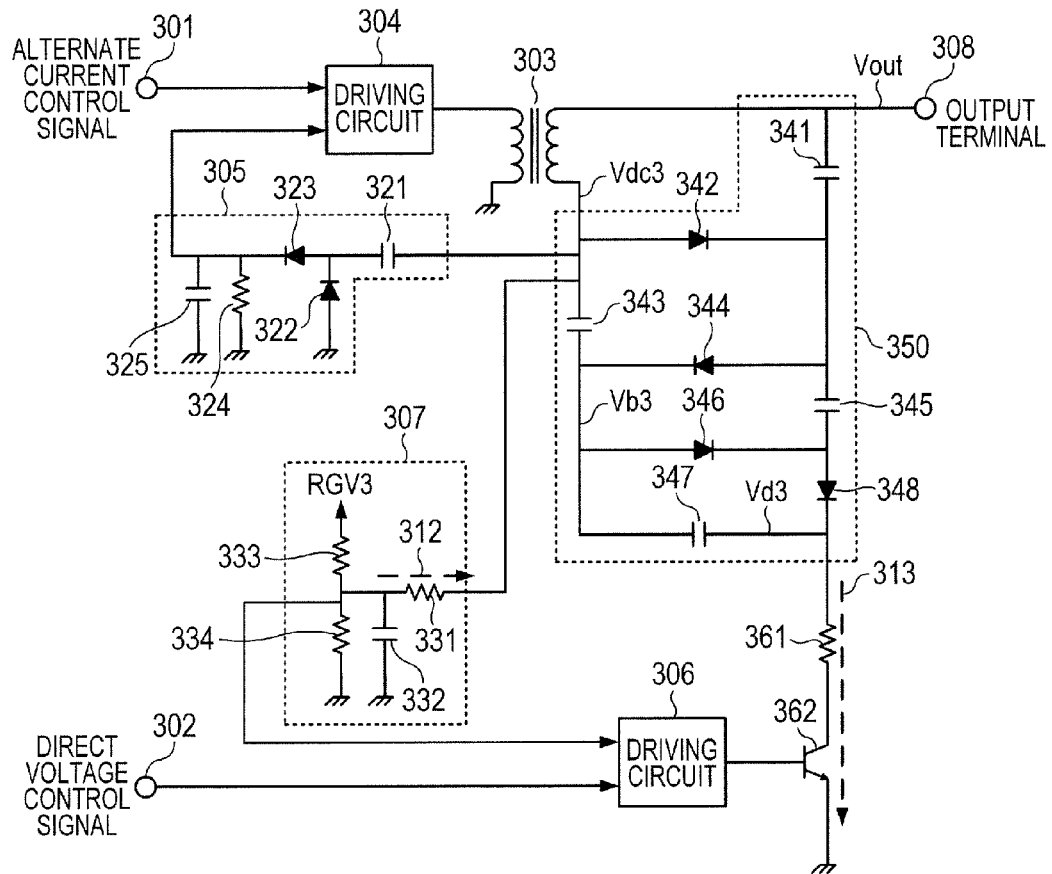
FIG. 3A is a circuit diagram of a high voltage power supply apparatus according to a second embodiment.

FIG. 3A is a circuit diagram of a high voltage power supply apparatus according to the present embodiment, the high voltage power supply apparatus being adapted to output a sine-wave alternate current voltage superposed with a direct current voltage of a negative potential. The high voltage power supply apparatus in FIG. 3A includes a transformer 303, driving circuits 304 and 306, an AC current detection circuit 305, a direct current voltage detection circuit 307, a half-wave voltage quadrupler rectifier circuit 350 and a transistor 362. The AC current detection circuit 305 has a configuration similar to the AC current detection circuit 205 according to the first embodiment described above and includes a coupling capacitor 321, rectifier diodes 322 and 323, a current detection resistor 324 and a capacitor 325. Also, the driving circuit 304 is similar in configuration to the driving circuit 204 according to the first embodiment and is adapted to accept as input an AC current control signal 301 as well as detection results from the AC current detection circuit 305 and control driving of the transformer 303. The direct current voltage detection circuit 307 has a configuration similar to the direct current voltage detection circuit 207 according to the first embodiment and includes a sensing resistor 331, a capacitor 332, voltage dividing resistors 333 and 334 and a constant voltage source RGV3. Also, the driving circuit 306 is similar in configuration to the driving circuit 206 according to the first embodiment and is adapted to accept as input a direct current voltage control signal 302 as well as detection results from the direct current voltage detection circuit 307 and control driving of the transistor 362, being connected to a base terminal of the transistor 362. Furthermore, the transformer 303 and transistor 362 are similar to the transformer 203 and transistor 262 according to the first embodiment. Dash-lined arrows 312 and 313 indicate paths of DC currents flowing in the direct current voltage detection circuit 307 and transistor 362, respectively, as in the case of the first embodiment.

In the present embodiment, an output from the transformer 303 is converted into a direct current voltage by the half-wave voltage quadrupler rectifier circuit 350 made up of capacitors 341, 343, 345 and 347 and diodes 342, 344, 346 and 348 unlike the half-wave voltage doubler rectifier circuit 250 according to the first embodiment. Then, the direct current voltage generated by the half-wave voltage quadrupler rectifier circuit 350 is input to a collector terminal of the transistor 362 via a current limiting resistor 361. The driving circuit 306 changes a current value of the DC current 313 flowing through the transistor 362 and thereby changes a current value of the DC current 312 flowing through the sensing resistor 331 of the direct current voltage detection circuit 307. Then, as the current value of the DC current 312 changes, a voltage drop amount across the sensing resistor 331 changes as well, thereby controlling the direct current voltage to be superposed with the alternate current voltage.

[Power Supply Waveform of High Voltage Power Supply Apparatus]

Figure 3B:
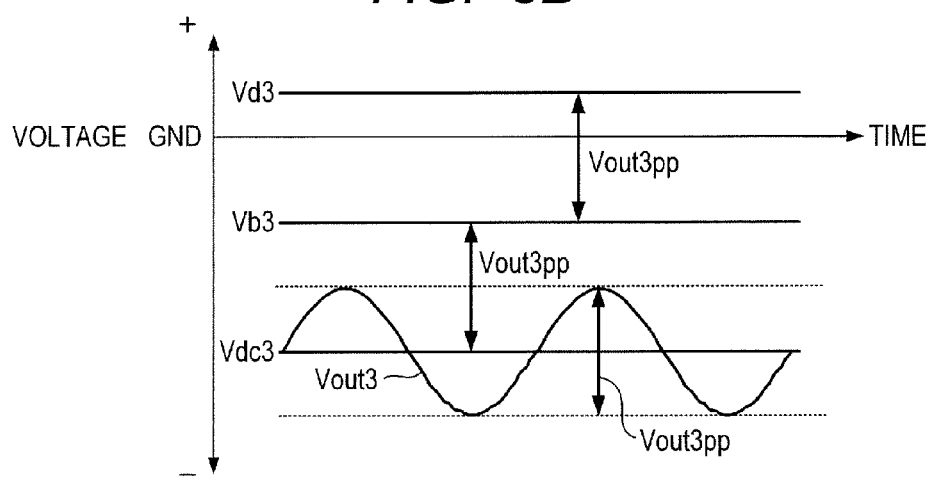
FIG. 3B is a diagram showing a voltage waveform in a circuit of the high voltage power supply apparatus according to the second embodiment.

FIG. 3B is a diagram showing a voltage waveform of the high voltage power supply apparatus according to the present embodiment. In FIG. 3B, the abscissa represents time while the ordinate represents voltage, "+" indicates positive (plus) potential, "−" indicates negative (minus) potential, and GND indicates the ground potential (0 volts). Voltage waveforms Vout3, Vdc3, Vb3 and Vd3 shown in FIG. 3B are voltage waveforms at locations Vout3, Vdc3, Vb3 and Vd3 in the circuit shown in FIG. 3A, respectively. That is, the voltage waveform Vout3 shows a voltage waveform of the output voltage Vout3 at an output end 308 while the voltage waveform Vdc3 shows a voltage waveform of a direct current voltage Vdc3 to be superposed with an alternate current voltage generated on a secondary side of the transformer 303. Also, the voltage waveform Vb3 shows a voltage waveform of an output voltage of the half-wave voltage doubler, i.e., a voltage waveform on the high-potential side of the capacitor 343 while the voltage waveform Vd3 shows a voltage waveform of an output voltage of the half-wave voltage quadrupler rectifier circuit 350, which is on the high-potential side of the capacitor 347. The voltage waveform Vout3 of the output end 308 is a sine wave whose center voltage is the direct current voltage Vdc3 and Vout3$pp$ in FIG. 3B is a peak-to-peak voltage of the alternate current voltage generated on the secondary side of the transformer 303. The half-wave voltage quadrupler rectifier circuit 350 accepts input of the alternate current voltage generated on the secondary side of the transformer 303 and generates a direct current voltage of a voltage amplitude four times as large as the input alternating current, i.e., a direct current voltage (Vout3$pp$/2)×4 times larger. Thus, as shown in FIG. 3B, the voltage Vb3 is at a level increased by the voltage Vout3$pp$ (=(Vout3$pp$/2)×2) from the voltage Vdc3. Similarly, the voltage Vd3 is at a level increased by the voltage Vout3$pp$ (=(Vout3$pp$/2)×2) from the voltage Vb3 or at a level increased by the voltage Vout3$pp$×2 (=(Vout3$pp$/2)× 2×2) from the voltage Vdc3.

Here, in order for a current to flow through the transistor 362, the voltage Vd3 has to be higher than the GND potential. That is, if Eq. (3) shown below holds, current can be passed through the transistor 362 and the driving circuit 306 can control the direct current voltage.

$$Vd3 = Vdc3 + (Vout3pp \times 2) > 0 \quad (3)$$

As can be seen from Eqs. (1), and (2) and (3), when the peak-to-peak voltages are identical, the high voltage power supply apparatus according to the present embodiment represented by Eq. (3) can output direct current voltage in a wider voltage range than can the first embodiment and conventional example represented by Eqs. (1) and (2). From Eq. (1) described above, the voltage difference between the direct current voltage Vb and direct current voltage Vdc on the high voltage power supply apparatus according to the first embodiment is Vpp1. Also, from Eq. (2) described above, the voltage difference between the direct current voltage Va173 and direct current voltage Vdc172 on the conventional high voltage power supply apparatus is Vpp174/2. Then, from Eq. (3), voltage difference between the direct current voltage Vd3 and direct current voltage Vdc3 on the high voltage power supply apparatus according to the present embodiment is Vout3$pp$×2. Since the peak-to-peak voltages Vpp1, Vpp174 and Vout3$pp$ in Eqs. (1), and (2) and (3) are identical in voltage value, it can be seen that the high voltage power supply apparatus according to the present embodiment has an output range of direct current voltage twice as wide as the high voltage power supply apparatus according to the first embodiment. Furthermore, it can be seen that the high voltage power supply apparatus according to the present embodiment has an output range of direct current voltage four times as wide as the conventional high voltage power supply apparatus.

The above configuration allows the range of the output direct current voltage to be increased without depending on an amplitude voltage of the alternate current voltage generated on the secondary side of the transformer 303. Furthermore, reducing the required number of transformers to one allows installation space to be reduced, enabling equipment downsizing and cost reduction. Note that if a voltage multiplier rectifier circuit larger in multiplication is used instead of the half-wave voltage quadrupler rectifier circuit 350, the superposed AC-DC high voltage power supply can be configured to output the direct current voltage in a still wider range. Thus, as described so far, the present embodiment allows a direct current voltage to be output even in case of a reduction in the amplitude of an alternate current voltage and enables equipment downsizing and cost reduction.

Third Embodiment

A superposed AC-DC high voltage power supply apparatus according to a third embodiment will be described with reference to FIGS. 4A and 4B. Whereas a high voltage power supply apparatus using a half-wave voltage doubler rectifier circuit has been described in the first embodiment, the present embodiment differs in that a Zener diode has been added to its configuration.

[Circuit Configuration of High Voltage Power Supply Apparatus]

Figure 4A:
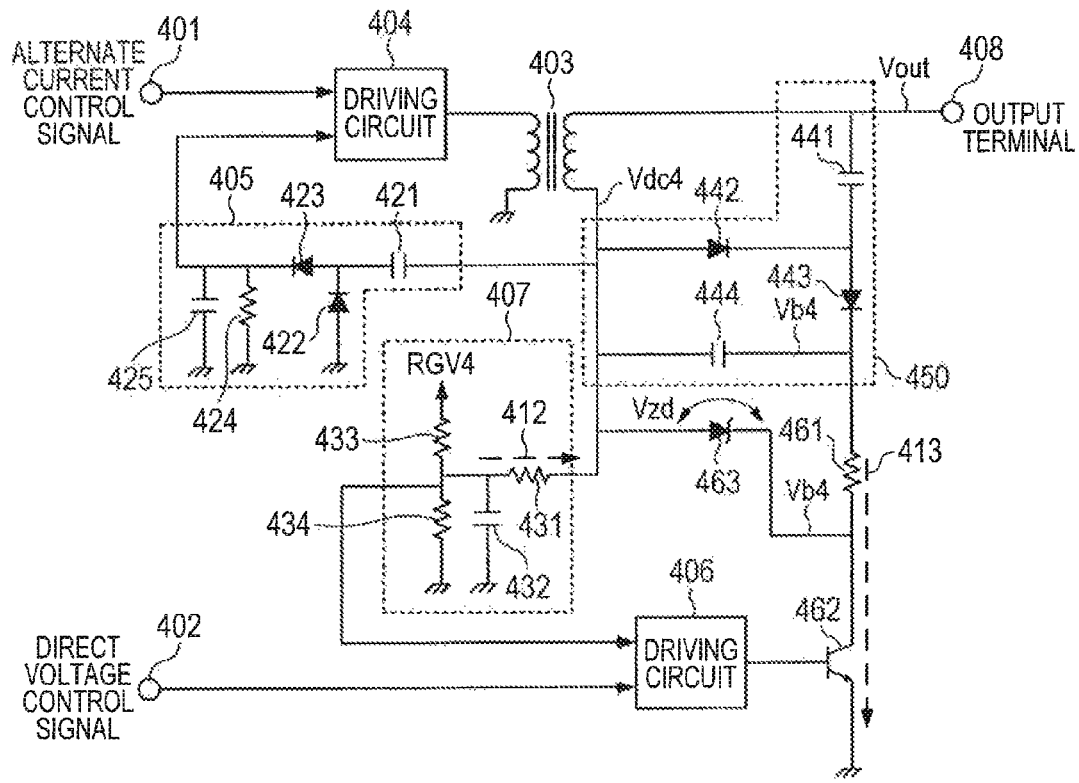
FIG. 4A is a circuit diagram of a high voltage power supply apparatus according to a third embodiment.

FIG. 4A is a circuit diagram of a high voltage power supply apparatus according to the present embodiment, the high voltage power supply apparatus being adapted to output a sine-wave alternate current voltage superposed with a direct current voltage of a negative potential. The high voltage power supply apparatus in FIG. 4A includes a transformer 403, driving circuits 404 and 406, an AC current detection circuit 405, a direct current voltage detection circuit 407, a half-wave voltage doubler rectifier circuit 450, a transistor 462 and a Zener diode 463. The AC current detection circuit 405 has a configuration similar to the AC current detection circuit 205 according to the first embodiment and includes a coupling capacitor 421, rectifier diodes 422 and 423, a current detection resistor 424 and a capacitor 425. Also, the driving circuit 404 is similar in configuration to the driving circuit 204 according to the first embodiment and is adapted to accept as input an AC current control signal 401 as well as detection results from the AC current detection circuit 405 and control driving of the transformer 403. The direct current voltage detection circuit 407 has a configuration similar to the direct current voltage detection circuit 207 according to the first embodiment and includes a sensing resistor 431, a capacitor 432, voltage dividing resistors 433 and 434 and a constant voltage source RGV4. Also, the driving circuit 406 is similar in configuration to the driving circuit 206 according to the first embodiment and is adapted to accept as input a direct current voltage control signal 402 as well as detection results from the direct current voltage detection circuit 407 and control driving of the transistor 462, being connected to a base terminal of the transistor 462. Furthermore, the transformer 403 and transistor 462 are similar to the transformer 203 and transistor 262 according to the first embodiment. Dash-lined arrows 412 and 413 indicate paths of DC currents flowing in the direct current voltage detection circuit 407 and transistor 462, respectively, as in the case of the first embodiment.

Also, an output from the transformer 403 is converted into a direct current voltage by the half-wave voltage doubler rectifier circuit 450 made up of a capacitor 441, rectifier diodes 442 and 443 and a smoothing capacitor 444 as in the case of the half-wave voltage doubler rectifier circuit 250 according to the first embodiment. Then, the direct current voltage generated by the half-wave voltage doubler rectifier circuit 450 is input to a collector terminal of the transistor 462 via a current limiting resistor 461. Note that an upper limit is imposed on the voltage input to a collector terminal of the transistor 462 by the Zener diode 463 described later. The driving circuit 406 changes a current value of the DC current 413 flowing through the transistor 462 and thereby changes a current value of the DC current 412 flowing through the sensing resistor 431 of the direct current voltage detection circuit 407. Then, as the current value of the DC current 413 changes, a voltage drop amount across the sensing resistor 431 changes as well, thereby controlling the direct current voltage to be superposed with the alternate current voltage.

Furthermore, the Zener diode 463 which is a constant voltage element is added in the present embodiment. An anode terminal which is one end of the Zener diode 463 is connected to a low-potential side of the transformer 403 and a cathode terminal which is another end is connected to the collector terminal of the transistor 462, the collector terminal being a point of junction with the half-wave voltage doubler rectifier circuit 450. A Zener voltage of the Zener diode 463 will be denoted by Vzd. Then, a voltage Vb4 which is a voltage of the cathode terminal of the Zener diode 463 equals a voltage obtained by adding the Zener voltage Vzd to a direct current voltage Vdc4 of a negative potential (Vb4=Vdc4+Vzd) and does not exceed this level.

[Power Supply Waveform of High Voltage Power Supply Apparatus]

Figure 4B:
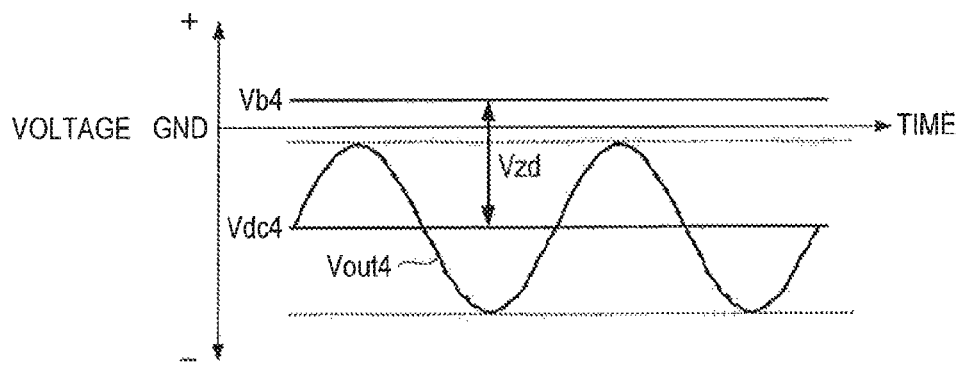
FIG. 4B is a diagram showing a voltage waveform in the circuit diagram of the high voltage power supply apparatus according to the third embodiment.

FIG. 4B is a diagram showing a voltage waveform of the high voltage power supply apparatus according to the present embodiment. In FIG. 4B, the abscissa represents time while the ordinate represents voltage, "+" indicates positive (plus) potential, "−" indicates negative (minus) potential, and GND indicates the ground potential (0 volts). Voltage waveforms Vout4, Vdc4 and Vb4 shown in FIG. 4B are voltage waveforms at locations Vout4, Vdc4 and Vb4 in the circuit shown in FIG. 4A, respectively. That is, the voltage waveform Vout4 is a voltage waveform of the output voltage Vout4 at an output end 408 while the voltage waveform Vdc4 is a voltage waveform of a direct current voltage Vdc4 to be superposed with an alternate current voltage generated on a secondary side of the transformer 403. Also, the voltage waveform Vb4 shows the voltage waveform at the cathode terminal of the Zener diode 463. The voltage waveform Vout4 of the output end 408 is a sine wave whose center voltage is the direct current voltage Vdc4. Also, as described above, the voltage Vb4 is at a level increased by the Zener voltage Vzd from the voltage Vdc4 and does not exceed this level. Here, the voltage developed across the current limiting resistor 461 is small enough to be ignored. The installation of the Zener diode 463 allows the voltage applied between an emitter terminal and collector terminal of the transistor 462 to be clamped at or below a predetermined voltage, enabling the use of a transistor with a low withstand voltage. Since transistors increase in prices with increases in withstand voltage, the use of the Zener diode and a transistor with a low withstand voltage provides a less expensive circuit configuration than the first embodiment. Note that although in the configuration described in the present embodiment, a Zener diode is added to the high voltage power supply apparatus which uses the half-wave voltage doubler rectifier circuit according to the first embodiment, a Zener diode can similarly be added, for example, to the half-wave voltage quadrupler rectifier circuit according to the second embodiment. As described so far, the present embodiment allows a direct current voltage to be output even in case of a reduction in the amplitude of an alternate current voltage and enables equipment downsizing and cost reduction.

Fourth Embodiment

Next, a configuration of an image forming apparatus to which the power supply apparatus according to the first to third embodiments are applicable will be described.

[Configuration of Image Forming Apparatus]

Figure 5:
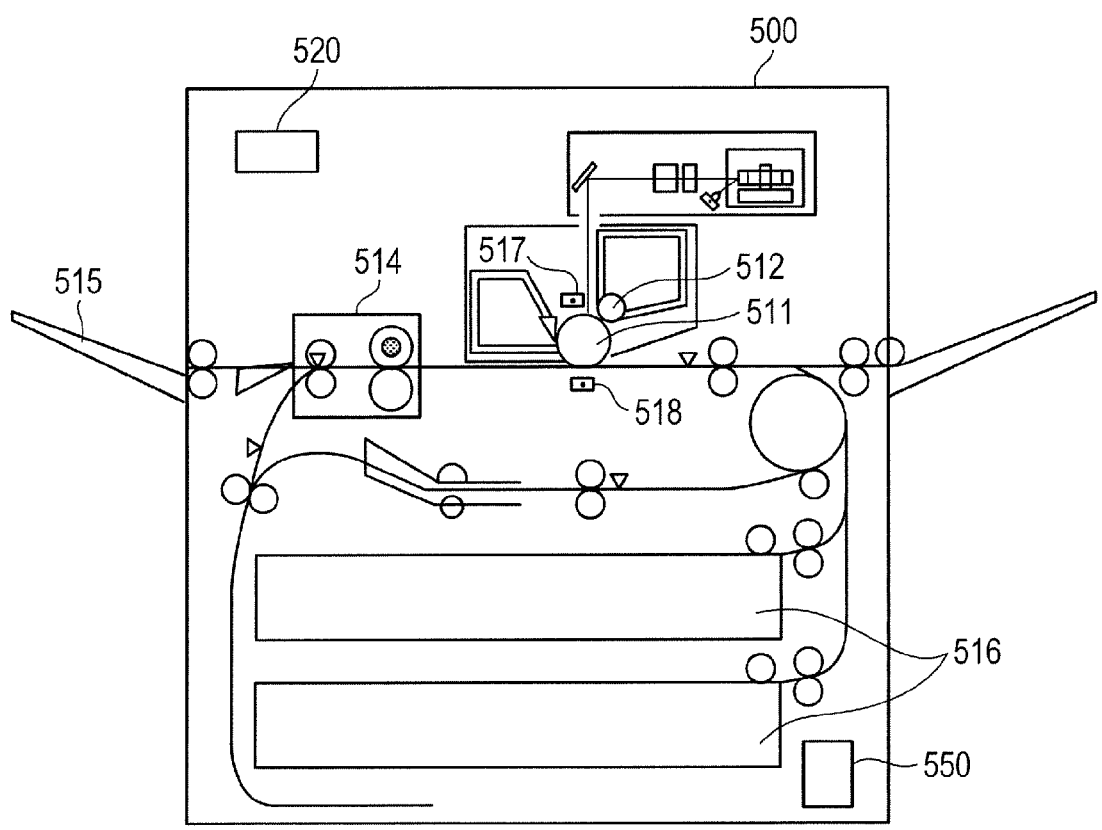
FIG. 5 is a schematic diagram of an image forming apparatus according to a fourth embodiment.

A laser beam printer will be described as an example of the image forming apparatus. A schematic configuration of a laser beam printer which is an example of an electrophotographic printer is shown in FIG. 5. The laser beam printer 500 includes a photosensitive drum 511 adapted to serve as an image bearing member on which an electrostatic latent image is formed, a charge unit 517 (charging section) adapted to charge the photosensitive drum 511 uniformly, and a developing unit 512 (developing section) adapted to develop the electrostatic latent image formed on the photosensitive drum 511, with toner. Then, a toner image developed on the photosensitive drum 511 is transferred by a transfer unit 518 (transfer section) onto a sheet (not shown) supplied as a recording material from a cassette 516. The toner image transferred to the sheet is fixed by a fixing device 514 (fixing section), and then the sheet is discharged to a tray 515. The photosensitive drum 511, charge unit 517, developing unit 512, and transfer unit 518 make up an image forming unit. Also, the laser beam printer 500 is equipped with the power supply apparatus 550 described in any of the first to third embodiments as well as with a controller 520 adapted to control an image forming operation of the image forming unit and sheet transport operation. Note that the image forming apparatus to which the power supply apparatus 550 according to the first to third embodiments are applicable is not limited to the one illustrated by example in FIG. 5, and the image forming apparatus may be equipped with, for example, plural image forming units. Furthermore, the image forming apparatus may be equipped with a primary transfer unit adapted to transfer a toner image from the photosensitive drum 511 to an intermediate transfer belt which is an intermediate transfer member and a secondary transfer unit adapted to transfer the toner image from the intermediate transfer belt to a sheet.

The power supply apparatus 550 described in any of the first to third embodiments supplies a high voltage formed by superposing an alternate current voltage with a direct current voltage of a negative potential to the charge unit 517, developing unit 512, transfer unit 518 and fixing device 514 during charging, developing, transfer and fixing. Although a high voltage power supply apparatus in FIG. 5 is only the power supply apparatus 550, for example, a dedicated high voltage power supply apparatus may be provided for each of the charge unit 517, developing unit 512, transfer unit 518 and fixing device 514. Also, in the case of a color image forming apparatus, when toner images are primarily transferred to the intermediate transfer belt from the photosensitive drums 511, a high voltage is applied by the power supply apparatus 550 to primary transfer rollers serving as primary transfer units. Also, when the toner images are secondarily transferred from the intermediate transfer belt to a sheet (not shown), a high voltage is applied by the power supply apparatus 550 to a secondary transfer roller serving as a secondary transfer unit. As described so far, the present embodiment allows a direct current voltage to be output even in case of a reduction in the amplitude of an alternate current voltage and enables equipment downsizing and cost reduction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-058499, filed Mar. 20, 2014, which is hereby incorporated by reference herein in its entirety.

What is claimed is:

1. A power supply apparatus constructed to output a voltage obtained by superposing an alternate current voltage with a direct current voltage, comprising:
   one transformer whose primary side and secondary side are insulated;
   a first driving unit connected to the primary side of the transformer and constructed to drive the primary side of the transformer so as to output the alternate current voltage from the secondary side of the transformer;
   a direct current voltage generation unit having a plurality of a capacitor and a diode and is connected to the secondary side of the transformer and constructed to amplify a voltage output from the secondary side of the transformer and to output the amplified voltage as a direct current voltage;
   a voltage detection unit connected to the direct current voltage generation unit and constructed to detect the direct current voltage output from the direct current voltage generation unit; and
   a second driving unit connected to the detection unit and the direct current voltage generation unit and constructed to control the direct current voltage output from the direct current voltage generation unit according to a detection result of the voltage detection unit and a target voltage.

2. A power supply apparatus according to claim 1, wherein the direct current voltage generation unit is constructed to output the direct current voltage with a voltage value two times or four times as large as a peak voltage of a half wave of the alternate current voltage.

3. A power supply apparatus according to claim 2, further comprising a constant voltage element connected at one end to the other end on the secondary side of the transformer and connected at another end to a junction point between the direct current voltage generation unit and the detection unit.

4. A power supply apparatus according to claim 3, wherein the constant voltage element is a Zener diode;
   an anode terminal of the Zener diode is connected to the other end on the secondary side of the transformer; and
   a cathode terminal of the Zener diode is connected to the junction point between the direct current voltage generation unit and the detection unit.

5. A power supply apparatus according to claim 1, further comprising a current detection unit constructed to detect an AC current flowing on the secondary side of the transformer, wherein the first driving unit drives the primary side of the transformer based on a detection result produced by the current detection unit and a first control signal which represents a predetermined current value.

6. A power supply apparatus according to claim 1, wherein the voltage detection unit has a resistor; and
the second driving unit controls a current flow in the resistor to control the direct current voltage.

7. A power supply apparatus according to claim 6,
wherein the second driving unit controls the current flowing through the resistor of the voltage detection unit based on the detection result produced by the voltage detection unit and a control signal corresponding to the target voltage.

8. A power supply apparatus according to claim 7, wherein the voltage control unit includes a transistor whose collector terminal is connected to the direct current voltage generation unit and whose emitter terminal is grounded; and
the second driving unit controls the current flowing through the resistor of the voltage detection unit by controlling a current flowing through the transistor.

9. An image forming apparatus comprising:
an image forming unit constructed to form an image; and
a power supply constructed to supply a voltage obtained by superposing an alternate current voltage with a direct current voltage to the image forming unit, wherein the power supply comprises:
one transformer whose primary side and secondary side are insulated;
a first driving unit connected to the primary side of the transformer and constructed to drive the primary side of the transformer so as to output the alternate current voltage from the secondary side of the transformer;
a direct current voltage generation unit having a plurality of a capacitor and a diode and is connected to the secondary side of the transformer and constructed to amplify a voltage output from the secondary side of the transformer and to output the amplified voltage as a direct current voltage;
a voltage detection unit connected to the direct current voltage generation unit and constructed to detect the direct current voltage output from the direct current voltage generation unit; and
a second driving unit connected to the detection unit and the direct current voltage generation unit and constructed to control the direct current voltage output from the direct current voltage generation unit according to a detection result of the voltage detection unit and a target voltage.

10. An image forming apparatus according to claim 9, wherein the image forming unit comprises an image bearing member on which an electrostatic latent image is formed, a charging unit constructed to charge the image bearing member at a predetermined potential, a developing unit constructed to develop the electrostatic latent image on the image bearing member with toner and thereby form a toner image, a transfer unit constructed to transfer the toner image to a sheet, and a fixing unit constructed to fix the toner image transferred to the sheet on the sheet; and
the power supply outputs a voltage to at least one of the charging unit, the developing unit, the transfer unit and the fixing unit.

\* \* \* \* \*